(No Model.)

J. W. PARKIN.
PULLEY.

No. 472,769. Patented Apr. 12, 1892.

WITNESSES:
P. Fr. Eagles.
L. Douville.

INVENTOR
Joseph W. Parkin
BY
ATTORNEY.

UNITED STATES PATENT OFFICE.

JOSEPH W. PARKIN, OF PHILADELPHIA, PENNSYLVANIA.

PULLEY.

SPECIFICATION forming part of Letters Patent No. 472,769, dated April 12, 1892.

Application filed December 30, 1891. Serial No. 416,583. (No model.)

*To all whom it may concern:*

Be it known that I, JOSEPH W. PARKIN, a citizen of the United States, residing in the city and county of Philadelphia, State of Pennsylvania, have invented a new and useful Improvement in Pulleys, which improvement is fully set forth in the following specification and accompanying drawings.

My invention consists of a pulley formed with a central sleeve, between which and the body of the pulley is a series of anti-friction balls, whereby the pulley is adapted to rotate with ease and uniformity.

It also consists in forming the sleeve of two parts, whereby the balls may be readily located, said parts being provided with flanges, which inclose the balls, the parts being connected, whereby the displacement of the same and of the balls is prevented.

Figure 1:
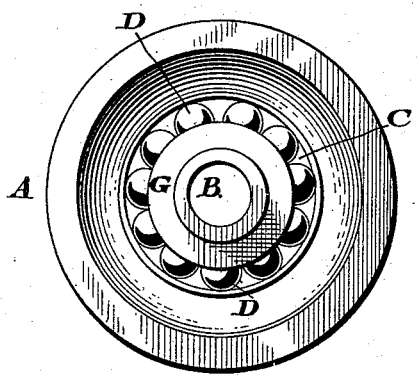
Figure 2:
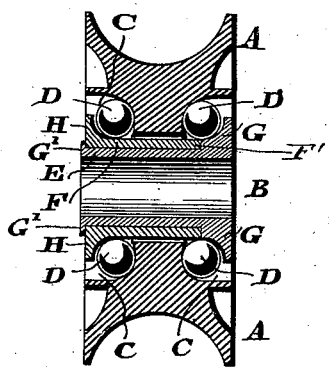

Figure 1 represents a side elevation of a pulley embodying my invention. Fig. 2 represents a section thereof.

Similar letters of reference indicate corresponding parts in both figures.

Referring to the drawings, A designates the body of a pulley, in the center of which is a transverse opening, which is occupied by a sleeve or bushing B, formed of metal or other suitable material and independent of said body. The sides of the body A are channeled or grooved, and the ends of the sleeve are flanged, thus producing the two circular chambers C, which are occupied by the loose anti-friction balls D, it being seen that the body A has its bearings on said balls, by which provision, as the balls revolve, said body runs with ease and uniformity.

The sleeve B is formed of two sleeves E and F, one fitted on the other, the outer ends of each sleeve having flanges G H, respectively, which fully inclose the balls D and constitute portions of the chambers C, as above stated.

The inner end of the sleeve F abuts against a shoulder F', formed on the face of the sleeve E, and the outer surface of each at the joint thus formed is flush, so as to present a smooth surface for the anti-frictional balls D.

The end of the sleeve E opposite to the flange G is turned over the adjacent end of the sleeve F, forming the lip G', by which provision the two sleeves are connected as one and separation of the same is prevented, the sleeve B thus retaining its position within the body A and the balls being accordingly confined in the chamber C.

Should it be desired to remove the sleeve B, the lip G' is bent outwardly, so that it is disconnected from the end of the sleeve F, whereby the sleeves E and F may be slipped off of each other, thus separating the same, and consequently permitting the displacement of the sleeve B.

Having thus described my invention, what I claim as new, and desire to secure by Letters Patent, is—

A pulley having a body with grooved sides and a sectional bushing with flanged ends, said flanges and grooved sides forming circular chambers, and anti-frictional balls in said chambers, said bushing consisting of inner and outer sleeves, the inner having a shoulder and a lip thereon, said parts being combined substantially as described.

JOSEPH W. PARKIN.

Witnesses:
 CHARLES SCHAEPPI,
 HARRY N. AUTENRIETH.